United States Patent [19]
Lochridge et al.

[11] 3,744,258
[45] July 10, 1973

[54] METHOD AND APPARATUS FOR CONNECTING A PIPELINE TERMINUS TO AN UNDERWATER INSTALLATION

[75] Inventors: Joe C. Lochridge; William R. Rochelle, both of Houston, Tex.

[73] Assignee: Brown & Root, Inc., Houston, Tex.

[22] Filed: Nov. 3, 1970

[21] Appl. No.: 86,482

Related U.S. Application Data

[62] Division of Ser. No. 817,495, April 18, 1969, Pat. No. 3,579,436.

[52] U.S. Cl. .................... 61/72.3, 285/18, 285/24
[51] Int. Cl. .................... F16l 25/00, B21d 11/02
[58] Field of Search ............. 61/72.3, 72.1; 166/6, 15; 285/18, 24

[56] References Cited
UNITED STATES PATENTS

| | | | |
|---|---|---|---|
| 3,434,296 | 3/1969 | Otteman et al. | 61/72.3 |
| 3,390,532 | 7/1968 | Lawrence | 61/72.3 |
| 3,331,212 | 7/1967 | Cox et al. | 61/72.3 |
| 3,585,805 | 6/1971 | Vincent | 61/72.3 |

*Primary Examiner*—Jacob Shapiro
*Attorney*—Burns, Doane, Swecker & Mathis

[57] ABSTRACT

A method and apparatus for connecting a pipeline to an underwater installation wherein a conduit of the underwater installation is provided with a receiving funnel and a drawline is threaded through that conduit and through the funnel. The drawline is connected to pipeline terminus and is tensioned to draw the pipeline terminus through the water and into the funnel. During this tensioning the pipeline is buoyantly supported and the buoyant support is slidably moved with respect to the pipeline, the pipeline and underwater installation are subsequently secured in fluid communication. Drawline tension may be balanced by applying tension to the pipeline in a direction opposite to that of the drawline tension.

2 Claims, 7 Drawing Figures

PATENTED JUL 10 1973
3,744,258
SHEET 1 OF 3
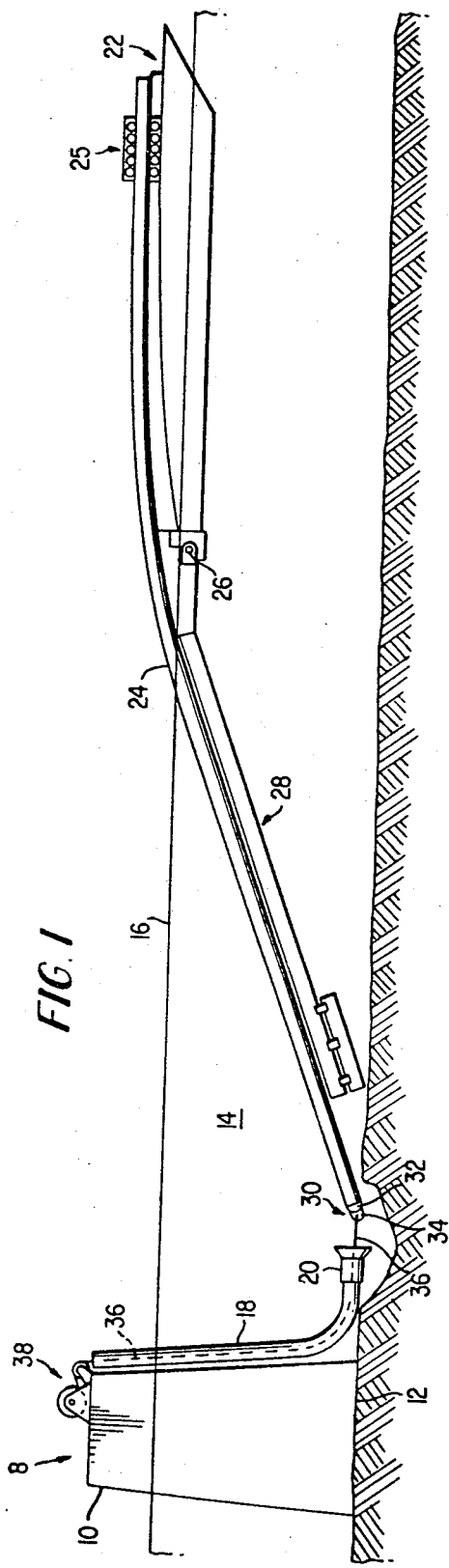
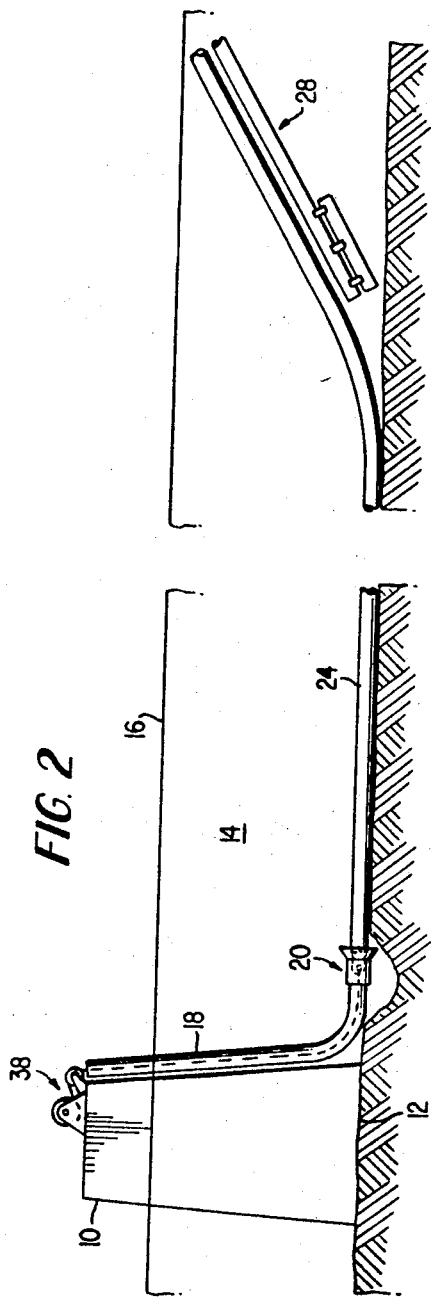
INVENTORS
JOE C. LOCHRIDGE
WILLIAM R. ROCHELLE
BY
Burns, Doane, Swecker & Mathis
ATTORNEYS

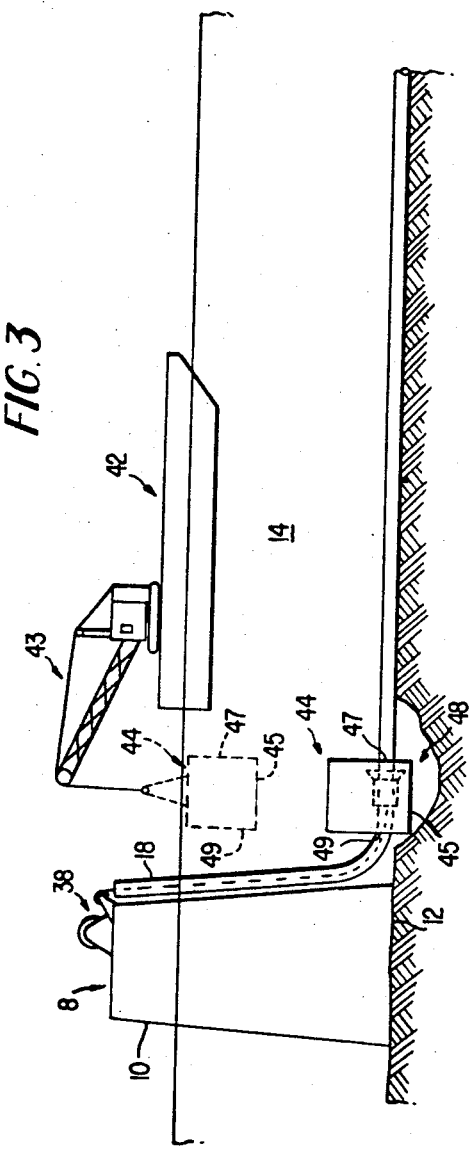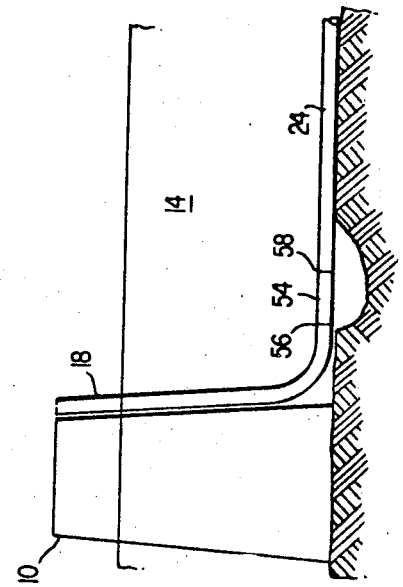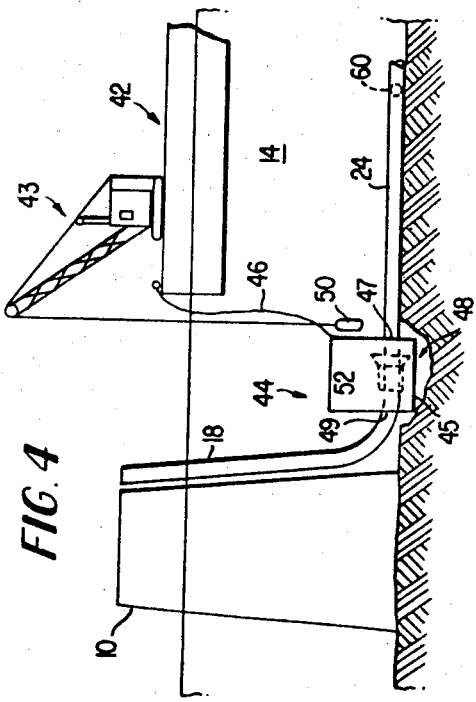

METHOD AND APPARATUS FOR CONNECTING A PIPELINE TERMINUS TO AN UNDERWATER INSTALLATION

RELATED APPLICATION

This application is a division of applicants' copending application, Ser. No. 817,495, filed Apr. 18, 1969 for "Pipeline Connections With Underwater Work Chamber", now U.S. Pat. No. 3,599,436.

BACKGROUND OF THE INVENTION

This invention relates to underwater pipelaying. More particularly, this invention relates to a method and apparatus for connecting a pipeline terminus to an underwater installation.

In pipelaying methods, it has been proposed to make the initial or terminal connection of a flowline to an underwater installation by mechanically coupling the submerged flowline terminus of a conduit portion to the underwater installation. Techniques developed for such couplings usually involve the need for various sealing assemblies between the flowline and the installation.

Since these assemblies may require replacement after a time, it would be highly desirable to eliminate the need for their provision.

Moreover, it would also be desirable to eliminate the need for producing fairly intricate coupling assemblies for each initial or terminal connection.

The disclosure of applicants' copending application Ser. No. 817,495, is concerned in some respects with pipeline laying operations involving the welding of the flowline to a conduit of an underwater installation so as to obviate the need for sealing and coupling assemblies. Such welding operations have been accomplished in the past in the connection of pipelines to risers. However, the pipeline has been welded to an installation conduit known as a riser at a station above the surface of the water, and then the entire welded assembly has been lowered to a submerged position.

In order to avoid damaging the pipeline during lowering, by introducing undesirable stresses therein, the handling of the riser and the length of pipeline adjacent to the welded portion requires precision controls. Since an error in the lowering operation could have damaging consequences from the standpoint of both equipment and personnel, it was recognized as highly desirable to obtain the advantages of a welded connection, while avoiding the necessity of lowering the riser and connected pipeline. This could be accomplished, as set forth in applicants' copending application, Ser. No. 817,495, by isolating the submerged termini of the flowline and the installation conduit from the body of water by placing an underwater work chamber, or habitat, thereabout.

Underwater work chambers have been proposed in the past for an entirely different purpose, i.e., to isolate damaged sections of submerged pipelines remote from the pipeline terminus. However, their use to facilitate the terminal connection of a pipeline to an underwater installation conduit advantageously avoids the previously described problems associated with both the lowering of a cumbersome welded connection and the replacement of coupling and sealing assemblies.

During the implementation of an underwater terminal connection involving the coupling of a pipeline terminus to a conduit portion of an underwater installation such as a riser, it would be desirable to minimize the bending stress concentration on the portion of the pipeline being moved toward the underwater installation. In this connection, it would also be desirable to avoid uncontrolled movement of the pipeline.

OBJECTS AND SUMMARY OF THE INVENTION

It is therefore an object of the present invention to provide a method and apparatus for implementing an underwater terminal connection of a pipeline terminus to an underwater installation wherein such bending stress concentration is minimized.

It is a related object of the present invention to provide such a method and apparatus wherein uncontrolled pipeline movement is militated against.

It is a further object of the present invention to minimize such stress concentration through the buoyant support of a pipeline and the slidable movement of the buoyant support with respect to the pipeline while a drawline connected to the pipeline terminus, and threaded through a receiving funnel on a conduit of the underwater installation, is tensioned to draw the pipeline terminus through the water and into the receiving funnel.

It is still a further object of the present invention to avoid uncontrolled pipeline movement through the balancing of the drawline tension.

A preferred form of the invention intended to accomplish at least some of the foregoing objects involves the provision of a conduit of an underwater installation with a receiving funnel. The pipeline terminus is provided with an end cap which may be generally spherical or flat.

A drawline threaded through the submerged installation conduit and connected to the pipeline terminus is tensioned to pull the pipeline, a portion of which is buoyantly and slidably supported, into the receiving funnel. In this fashion, the bending stress concentration on the portion of the pipeline being moved toward the funnel is minimized.

Uncontrolled pipeline movement is avoided through the application of tension to the pipeline in a direction opposite to that of the drawline tension.

THE DRAWINGS

Other objects and advantages will become apparent from the following detailed description of the invention with reference to the accompanying drawings in which:

FIG. 1 is a schematic illustration of a buoyantly supported pipeline being pulled into an alignment funnel on a riser;

FIG. 2 is a schematic illustration of the pipeline telescoped and snubbed into the funnel;

FIG. 3 is a schematic illustration of an underwater welding habitat being lowered over the riser and pipeline termini;

FIG. 4 is a schematic illustration of the preparation of the riser and pipeline for connection;

FIG. 5 is a schematic illustration of the welded connection between the pipeline and riser.

DETAILED DESCRIPTION

General Environment

Figure 2A:
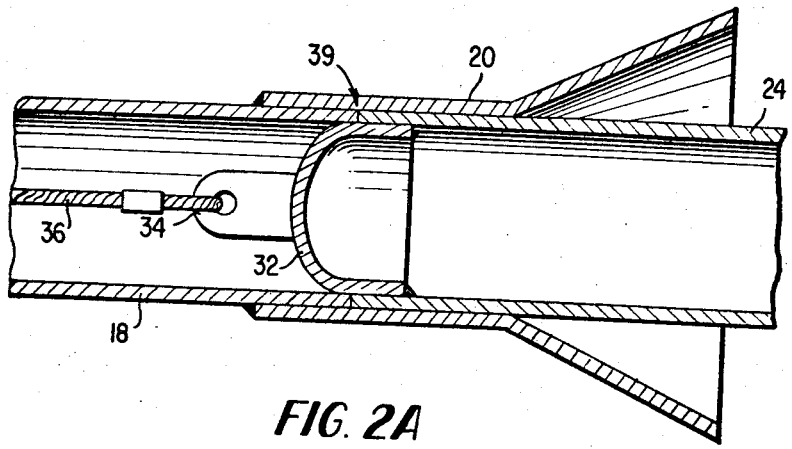
FIG. 2A is a cross-sectional elevational view of the telescoped and snubbed engagement between the pipeline and funnel.

Referring now to FIG. 1, an underwater installation 8, including an offshore platform 10 located on a surface 12 submerged below a water body 14, is there shown.

Secured to the platform 10 in any suitable manner, and projecting above the water surface 16, is a generally J-shaped conduit or "riser" 18. This riser is provided on its submerged end with an alignment or receiving funnel 20 attached in any suitable manner. The funnel 20 is of outwardly diverging, generally frusto-conical configuration.

A lay barge 22 is shown as floating on the water body 14. This barge supports an elongate flexible pipeline 24 which is about to be laid away from the platfrom 10.

Pivotally connected to the barge 22, as indicated at 26, is a pipelaying pontoon 28 for slidably and buoyantly supporting the pipeline 24 as it is being laid. For a more detailed description of the structure and mode of operation of a preferred form of the pontoon, reference may be had to U.S. Pats. Nos. 3,280,571 and 3,390,532, assigned to the assignee of the present invention. The disclosures of these patents are hereby incorporated by reference.

For simplicity, the invention will be described in connection with a "laying away" operation, i.e., where the pipeline laying operation is initiated adjacent an installation and is continued while moving away from its point of inception. However, it will be apreciated that the invention may also be employed in a "laying toward" operation, i.e., where the pipeline laying operation is nearing completion and requires the terminus of the pipeline to be connected to an installation.

Moreover, coupling of the pipeline 24 to an underwater installation in the form of an underwater wellhead rather than a riser is contemplated.

Detailed Structure and Operation

Referring now to FIG. 1, it will be seen that the pipeline terminus 30 is provided with a plug means 32. This plugs means may be in the form of a generally spherical end cap, often termed a bull plug, and may be welded, or otherwise secured to the pipeline terminus. It will be apparent that a flat end cap may also be employed.

Projecting outwardly from the bull plug 32 and fixed thereto is a clevis 34.

Upon positioning of the lay barge 22 adjacent the platform 10, the pipeline 24 may be force fed, by means of a wheeled tension unit, schematically shown at 25, onto the pontoon 28. Reference may be had to the previously incorporated disclosure of U.S. Pat. No. 3,390,532 for a more detailed description of the structure and operation of the tension unit 25.

The pontoon 28 may be designed so as to float adjacent the surface of the water body 14 when the pipeline 24 has been fed outwardly of the lay barge 22 and to the end of the pontoon, i.e., without any substantial projection of the pipeline beyond the generally horizontally floating pontoon.

A drawline 36 threaded through the riser is attached to the clevis 34. The riser 18 may be installed with the drawline 36 in place and a diver may be employed to attach the drawline to a suitable line (not shown) extending from the lay barge 22 or extending from a service boat (not shown), for facilitating pulling of the drawline 36 to the surface where it is attached to the clevis 32.

It will be apparent that the other acceptable methods of attaching the drawline 36 to the clevis 32 will occur to those skilled in the art, and that the drawline may alternatively be directly connected to a suitable drawline anchor means, other than an end cap, on the pipeline.

Tension applied to the drawline 36 by a deck engine 38 on the platform 10, or by suitable pulling apparatus (not shown) on the lay barge moves the buoyantly supported pipeline 24 axially along and beyond the pontoon 28 until the pipeline terminus is telescopingly received in the funnel 20, as illustrated in FIG. 2. In the event the pulling apparatus is located on the lay barge, the use of a suitable platform mounted sheave (not shown) may be required.

Movement of the pipeline beyond the pontoon 28 or controlled flooding of the pontoon, or both, causes the pontoon to assume a submerged position. If desired, the pontoon 28 may be of the articulated type or of the type which may be curved downwardly, such as that described in U.S. Rochelle et al application Ser. No. 696,005 (filed Jan. 5, 1968) assigned to the assignee of the present invention.

The outwardly diverging, generally frusto-conical configuration of the receiving funnel 20 causes the pipeline terminus to become generally axially aligned with the bottom portion of the riser when the internal diameter of the portion of the funnel adjacent the riser is substantially the same as, but slightly greater than the external diameter of the pipeline terminus as shown in FIG. 2A. Although the pipeline as shown has substantially the same diameter as the riser, it is feasible to have a pipeline terminus with an external diameter which is smaller than that of the riser, in which case, an internal annular projection (not shown) in the funnel may be provided to prevent movement of the pipeline terminus into the riser. In such a case, the axes of the pipeline and of the bottom riser portion may be coaxial or offset, but generally parallel.

For a purpose hereinafter described, the pipeline terminus may be moved into abutting relationship with the bottom portion of the riser inside the funnel, as indicated generally at 39 in FIG. 2A. In the case of a smaller diameter pipeline, an abutment may be mounted within the receiving funnel, between the riser terminus and the funnel mouth to abuttingly engage the received end of the pipeline.

During the pulling operation with the drawline 36, the pipeline tensioning apparatus 25 may be employed to balance the pull of the drawline so as to control pipeline stress and to avoid uncontrolled pipeline motion.

Thus, during tensioning of the drawline, the pipeline 24 is slidably moved with respect to the lay barge 22 and pontoon 28, toward the platform 10 and the bending stress concentration on the portion of the pipeline being moved from the pontoon toward the riser is minimized.

Where an underwater work chamber is to be employed as disclosed in applicant's copending application Ser. No. 817,495, after the lay barge has travelled a sufficient distance from the platform in order to lay the pipeline on the submerged surface 12, a work barge 42 is next located above the terminal portion of the pipeline 24 (FIG. 3). A suitable deck located derrick means 43 may be used to lower a welding habitat 44 from the work barge 42 to a submerged position over the terminal portions of the pipeline and the riser, including the funnel 20 and the snubbed bull plug 32.

Figure 4A:
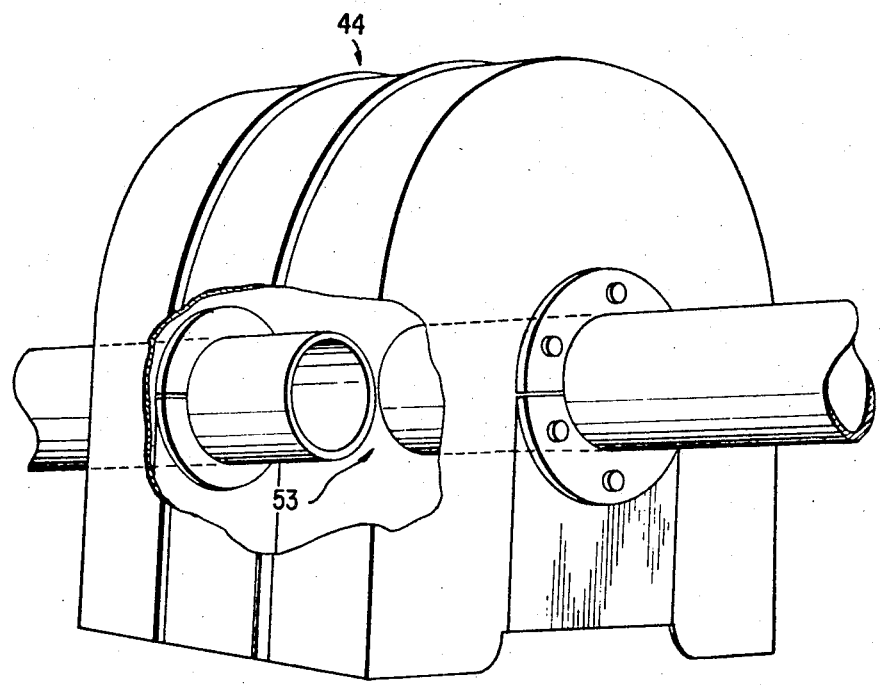
FIG. 4A is a schematic, cutaway perspective view of the habitat clamped about the aligned portions of the pipeline and riser.

As illustrated in FIG. 4, a life support and power umbilical means 46 is secured between the work barge 42 and the lowered habitat 44.

A previously provided excavation 48 in the submerged surface 12, located beneath the abutment of the pipeline and riser, permits the habit 44 to completely envelop the pipeline and riser termini.

The habitat 44 is provided with an open bottom 45, and the end walls 47 and 49 are provided with aligned slots (see FIG. 4A), adjacent the bottom. These slots and the open bottom receive the portions of the pipeline and riser adjacent the termini, after which the end wall slots are sealed to prepare the habitat for pressurizing to an amount sufficient to keep water out of the habitat. For a more detailed description of a suitable habitat and the method of its use, reference may be had to U.S. Pat. No. 2,667,751, the disclosure of which is incorporated by reference.

Subsequently, the habitat is pressurized with a heavily nitrogenous atmosphere for welding control purposes, using the umbilical means 46, to thereby isolate the terminal portions of the riser and pipeline from the water. The average pressure within the dry chamber is thus equal to that of the water therebeneath, in the excavation 48. It will be appreciated that air or other economical gas may be used instead of nitrogen prior to and subsequent to the need for welding control.

Divers next descend to enter the habitat. If desired, they may be lowered in a suitable diver chamber 50. These divers may enter the habitat from beneath, through the open bottom via the excavation 48, or through any other suitable access opening to the habitat.

Removal of the riser terminus and pipeline terminus, including the funnel 20 and the plug means, indicated in phantom at 52 (FIG. 4), may be accomplished in the dry work chamber by mechanical or torch cutting. It will be appreciated that since the habitat 44 is clamped about the riser and the pipeline as indicated at 53 (FIG. 4A), the pipeline and the riser remain aligned throughout and subsequent to the cutting operation.

Thereafter, as illustrated in FIG. 5, the removed sections are replaced by a conduit section 54, welded at 56 and 58 to the spaced ends of the riser 18 and the flowline 24 to secure the two in fluid communication.

In instances where the telescoped pipeline has been snubbed into engagement with the riser (FIG. 2A), the riser and pipeline may be premarked for cutting. Thus, the replacement section 54 may be of a predetermined size and may be accurately positioned without the pipeline or riser having to be manipulated and without necessitating the use of templates or the like for determining the correct size of the needed replacement conduit. The habitat 44 is then removed, and the drawline is retrieved through the riser.

Of course, if a smaller diameter pipeline is employed, and the axes of the lower riser portion and the pipeline are offset, the replacement conduit section should be suitably shaped for accomodating this offset.

Since the cutting operation is performed within the pressurized habitat 44, a yieldable plug 60 (FIG. 4) is provided within the pipeline, remote from the terminus, to prevent escape of the nitrogenous atmosphere therethrough. This plug may be frictionally engaged with the pipeline to entirely block the flow passage at pressures on the order of those anticipated within the habitat. However, the plug is yieldable and may be forced through the pipeline by higher pressure fluid to open the flow passage.

In order that the plug 60 may pass the bend in the riser 18 when the flow passage is to be opened, it is preferably generally spherical in shape.

To further prevent escape of the nitrogenous atmosphere through the riser 18, a wireline stuffing box (not shown), is provided at the upper end of the riser. A passage in the box allows for threading of the drawline 36 through the riser, but the box is provided with means for sealing the riser to prevent outflow of the nitrogenous atmosphere within the habitat. Of course, the box and drawline may be removed subsequent to the installation of the replacement conduit 54.

Further details of a suitable stuffing box may be found on page 3799 of the 1968–69 Catalog of Otis Engineering Company, Dallas, Tex., (the disclosure of which is hereby incorporated by reference).

It will be appreciated that other suitable means for preventing escape of the habitat atmosphere may be provided in either the pipeline 24 or the riser 18, or both.

Moreover, it will be apparent that the plug 60 may be installed in the pipeline on the lay barge or from within the habitat immediately after the cutting operation.

SUMMARY OF ADVANTAGES

Thus it may be seen that the present invention provides a method and apparatus for implementing an underwater terminal connection involving the coupling of a pipeline terminus to a conduit of an underwater installation wherein bending stress on a portion of the pipeline being moved toward the underwater installation is minimized by tensioning the drawline while buoyantly supporting the pipeline and slidably moving the buoyant support with respect to the pipeline.

Also of importance is the avoidance of uncontrolled pipeline movement by balancing the drawline tension.

Although the invention has been described with reference to the perferred form, other additions, not specifically described, will occur to those skilled in the art as well as modifications, substitutions, and deletions, which fall within the spirit and scope of the invention as defined by the following claims.

What is claimed is:

1. In a method of underwater laying of an elongate flexible pipeline and securing the pipeline terminus in fluid communication with a conduit portion of an underwater installation, the improvement comprising:
   providing an underwater installation conduit with a receiving funnel,
   threading a drawline through the conduit of the underwater installation and through the funnel,
   connecting the drawline to the pipeline terminus,
   tensioning the drawline to draw the pipeline terminus through the water and into the receiving funnel, while buoyantly supporting a submerged portion of the pipeline being moved toward the underwater installation and slidably moving the buoyant support with respect to the pipeline,
   controlling movement of the pipeline through the water by tensioning the pipeline in a direction opposite to tension applied by the drawline to balance the drawline tension, and securing the underwater installation and the pipeline in fluid communication.

2. In apparatus for connecting a pipeline terminus to a conduit portion of an underwater installation, the improvement comprising:

funnel means on the underwater installation conduit for receiving the terminus of the pipeline, drawline means, threaded through the conduit and said funnel means and attached to the pipeline, for moving the pipeline terminus into engagement with said funnel means, floating vessel means for slidably supporting the pipeline, said floating vessel means including means for buoyantly and slidably supporting a submerged portion of the pipeline, and tension means on said floating vessel means for applying tension to the pipeline in a direction opposite to tension applied by said drawline means to balance the tension applied by said drawline means.

* * * * *